United States Patent [19]
Mason et al.

[11] 3,712,118
[45] Jan. 23, 1973

[54] METHOD OF OIL CUT DETERMINATION

[75] Inventors: Robert W. Mason, Missouri City, Tex.; Frank O. Prochaska, Metarie, La.

[73] Assignee: Shell Oil Company, Houston, Tex.

[22] Filed: Feb. 26, 1971

[21] Appl. No.: 119,277

[52] U.S. Cl. .................................. 73/61.1 R, 210/21
[51] Int. Cl. ............................................. G01n 33/26
[58] Field of Search ......... 73/61.1 R, 53; 210/21, 511

[56] References Cited

UNITED STATES PATENTS 2,761,563  9/1956  Waterman et al. .................... 210/21
3,192,764  7/1965  Jasek ............................... 73/61.1 R
2,588,794  3/1952  Barton .................................. 210/21

Primary Examiner—Louis J. Capozi
Assistant Examiner—Joseph W. Roskos
Attorney—Theodore E. Bieber and Harold L. Denkler

[57] ABSTRACT

A method for determining the percentage oil in an oil-water emulsion which is predominately water, such as in a fluid stream produced from an oil field during a thermal secondary recovery process. The produced fluid stream is sampled continuously, the collected sample is then homogenized and sampled, and oil is removed from the second sample with an oil solvent heavier than water. Percentage oil is determined from the volume of oil removed by the solvent.

11 Claims, 5 Drawing Figures

PATENTED JAN 23 1973 3,712,118

R. W. Mason
F. O. Prochaska
INVENTORS

R. W. Mason
F. O. Prochaska
INVENTORS

METHOD OF OIL CUT DETERMINATION

BACKGROUND OF THE INVENTION

This invention relates to a method for determining the amount of oil in an oil-water emulsion. More particularly, the invention relates to a method of determining percentage oil in effluent produced from an oil field which has been produced according to a thermal recovery method.

Description of the Prior Art

In the operation of oil leases, wells frequently produced varying amounts of water along with oil and gas. This water must be separated from the oil and gas before the hydrocarbons are sold. It is common practice to achieve the separation of water from the oil by gravity segregation. Conventionally, gravity segregation facilities are placed on each lease in an oil field comprising a plurality of leases in order that the exact amount of saleable hydrocarbons allocable to each lease may be determined.

In the recovery of oil from fields which have been treated according to thermal secondary recovery methods, particularly from fields which have been treated with steam, it is common to produce oil-water emulsions. These emulsions may be of the normal oil-in-water type, of the water-in-oil type, or may be mixtures of the two types. The emulsions may be quite stable and may require substantial physical and chemical treatment before the oil can be separated from the water. The cost of the requisite treating facilities is much greater if facilities in a given field must be duplicated on each of the constituent leases of the field rather than provided at a central facility for treating all of the produced fluids from the field. Thus, there is considerable economic incentive to provide centralized treating facilities. However, if centralized facilities are to be used, there must be some way of determining how much oil is produced from each lease so that the owners of that lease may be credited with their proper share of the total field production.

Perhaps the most common method for measuring percentage oil in emulsion samples is by ASTM standard D 96–68 according to which oil is extracted from the emulsion with a solvent lighter than water. Percentage water or water-cut (which is equal to 100 percent minus the percentage oil) is then determined from the volume of water remaining. This standard test, developed for oil shipping, determines small quantities of water and sediment in oil with precision. However, when used on produced well fluids where the water content is over 25 percent, the accuracy of percentage oil determination by this method is plus or minus 5 percent and is not acceptable in allocating lease oil production treated in a central plant.

A number of other methods have been suggested for determining the percentage of oil flowing in a pipeline carrying a water-oil mixture. These methods are generally based upon detecting either density changes or electrical property, e.g., capacitance, changes of the produced fluid. Such systems have proven accurate for streams which are on the order of 60 percent or more oil. However, the accuracy of the systems is generally not adequate for lease allocation purposes when the produced fluid contains 80 percent or more water. The operability of these apparati is further limited when the specific gravity of the oil and water produced differs little, or when double emulsions or temperatures on the order of 200°F or more are present. These conditions are common in the production of oil from fields which have been treated with steam.

SUMMARY OF THE INVENTION

A method has now been found for accurately determining the percentage oil in a water and oil mixture comprising 0–20 volume percent oil which includes oil-water emulsions at temperatures that may exceed 200°F. In a specific embodiment, this method may be used in allocating produced oil to individual leases in a field in which produced fluid may be co-mingled prior to treatment for breaking the emulsions.

In a broad aspect, the invention comprises determining the percentage oil in a given sample of oil-water emulsion by adding a selected volume of a substantially water insoluable oil solvent having a density greater than the density of water to the sample of oil-water emulsion to extract oil from the sample, measuring the volume of the oil solvent and extracted oil dissolved in the solvent, and determining the percentage oil in the sample of oil-water emulsion from the measured volume of oil solvent and extracted oil. If the original sample of oil-water emulsion is large, it may be advantageous to homogenize this original sample to insure uniformity of composition throughout the sample and then to remove a smaller test volume of homogenized emulsion from the sample. A representative percentage oil for the entire sample may then be determined by treating this test volume according to the above-described method.

The present invention, by using a solvent heavier than water (as opposed to the ASTM solvents which are lighter than water), collects the oil in the bottom of the centrifuge tube where it can easily be decanted through a bottom valve to a graduated flask where the oil cut can be determined to plus or minus 0.2 percent.

In a more specific embodiment of the invention, the percentage oil in a flowing fluid stream containing oil-water emulsions may be determined by periodically extracting a selected sample volume from the fluid stream after equal volume increments of flow to obtain a sample of the fluid flowing during each volume increment; accumulating these samples in a sample accumulator for a desired length of time, which may be on the order of a week; homogenizing the collected samples; collecting a small test sample from this homogenized collection of accumulated samples; adding an emulsion breaker and a fixed volume of an oil solvent heavier than water, such as chloroform, to the test sample; agitating the mixture until a clean separation of water from fluid of greater density is observed; removing the fluid of greater density from the mixture; and accurately measuring the volume of this fluid. The percentage oil may then be determined from the increase in volume of the fluid of greater density. In a preferred embodiment the percentage oil is determined graphically.

DESCRIPTION OF THE PREFERRED EMBODIMENT

Figure 1:
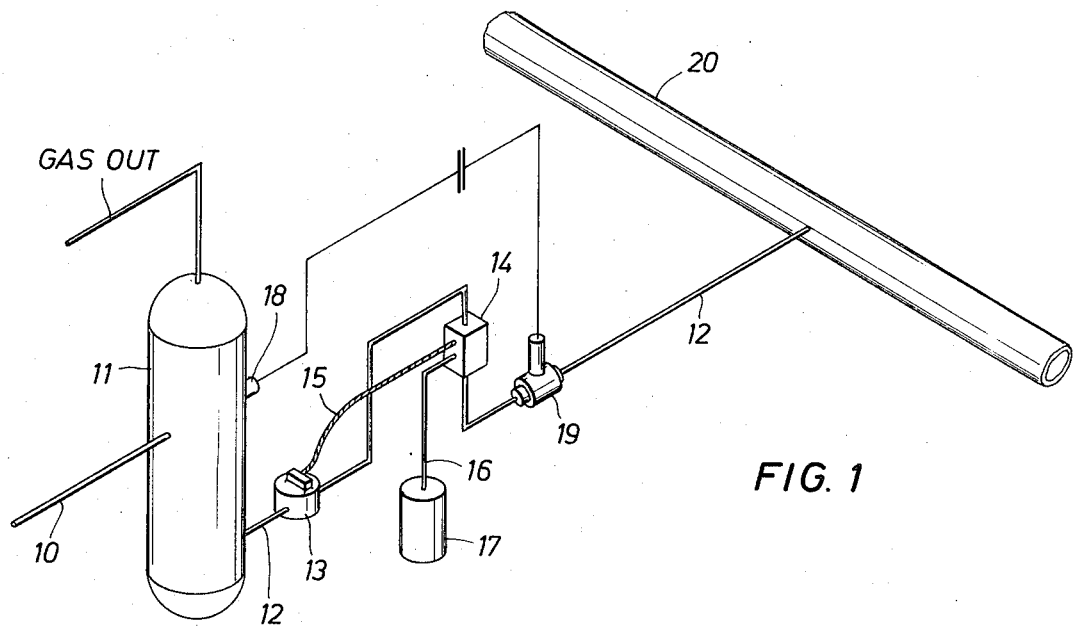
FIG. 1 is a schematic diagram showing oil field facilities of the type which may be used in practicing the method of this invention.

Referring to FIG. 1, we see a conduit 10 which carries produced fluid from a well or wells not shown. This fluid may be a water-oil mixture which comprises a normal emulsion of oil in water, a reverse emulsion of water in oil, or both. The fluid first flows to a gas trap or degasser 11 where any gaseous fluids in the produced fluid stream are removed. Liquid flows from the degasser 11 through conduit 12. A volumetric flow meter 13 is disposed in the conduit 12 for measuring the cumulative volumetric flow or fluid through that conduit. The flow meter 13 may be of the positive displacement type.

Downstream of the flow meter 13, a volumetric fluid sampler 14 is disposed in the conduit 12. The sampler 14 is preferably of a type which periodically extracts a fixed sample volume of fluid from the conduit 12. It may be operatively associated with the meter 13 in a manner such that one sample volume of fluid is removed from the conduit 12 each time a selective volume increment of fluid passes through the conduit 12. In the illustration of FIG. 1, the sampler 14 is driven by a flexible drive coupling 15 operatively connected to the meter 13 and the sampler 14 by suitable gear means (not shown). Thus, as flowing fluid drives the meter 13, the meter in turn controls the sampler. Frequency of sampling may be controlled by adjusting the ratio of the gears which operatively connect the drive coupling 15 to the meter 13 and the sampler 14. Each fluid sample collected by the sampler 14 passes through the conduit 16 into sample container 17.

The flow of liquid through the conduit 12 from the degasser 11 is regulated by a level controller 18 coupled to a control valve 19 disposed in the conduit 12 downstream of the sampler 14. The level controller opens the valve 19 when the liquid level in the degasser 11 rises above a predetermined maximum. Downstream of the control valve 19 the conduit 12 empties into a manifold 20 where the fluids passing through conduit 12 mingle with similar fluid streams for common treatment at a central processing and treating facility (not shown).

Figure 2:
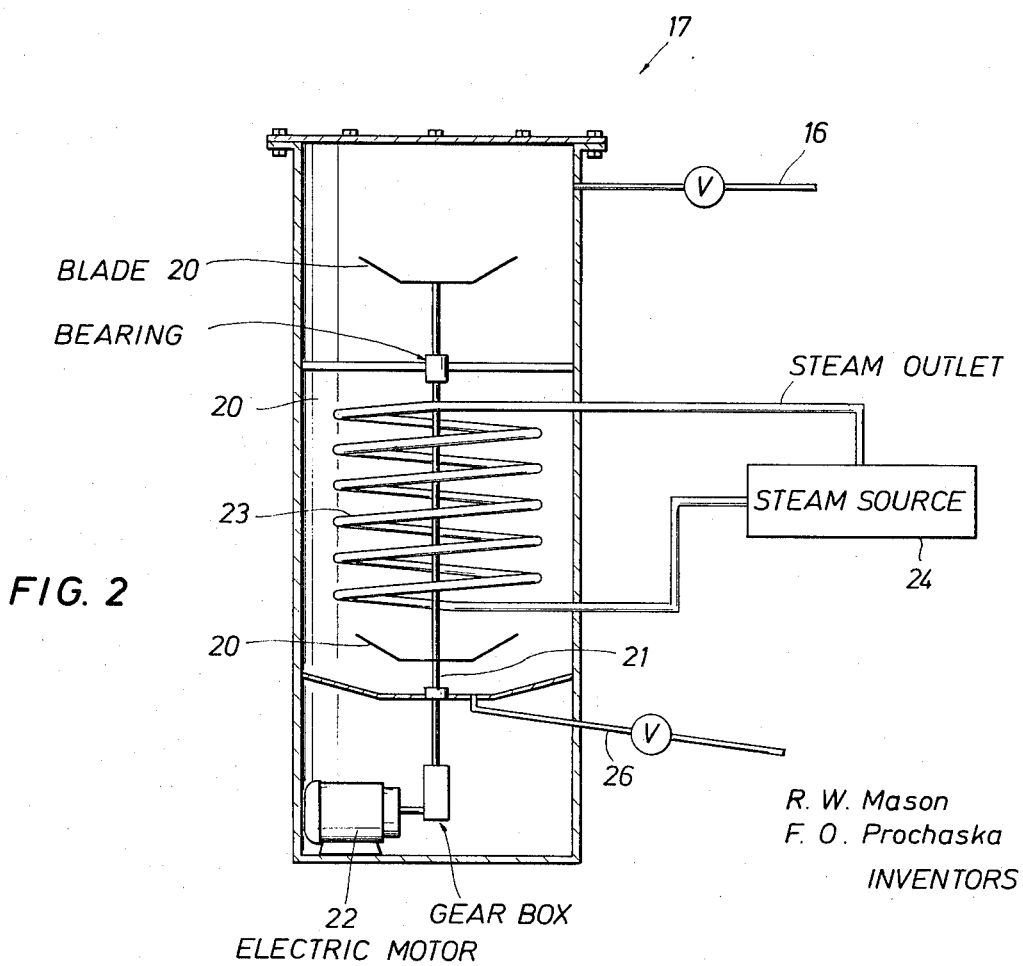
FIG. 2 shows a sample container and homogenizer which may be used in the practice of this invention.

The sample container 17 is advantageously equipped for homogenizing the fluid sample accumulated therein. For example, the container 17 may be provided with one or more agitating blades 20 (FIG. 2) which are mounted on a shaft 21 which is operatively connected to an electric motor 22 capable of driving the blades 20 to homogenize fluid in an agitation chamber 25. The container 17 may also be provided with a heating means for heating the collected sample and thereby reducing the viscosity of the oil in the sample. The heating means may be a helically wound conduit 23 operatively connected to a steam source 24. The container 17 is, of course, provided with fluidtight seals where the conduit 23 and the shaft 21 enter the agitation chamber 25.

In order to determine the percentage oil in the fluid flowing through the conduit 12 according to the method of this invention, the gear ratio of the gears in the meter 13 which drives the sampler 14 are preferably preset to drive the sampler at a frequency adequate to obtain a sample in the sample chamber 17 which is truly representative of the fluid flowing through the conduit 12 in a desired sampling time period. For example, if the sampler 14 collects 1 cc samples, it may be desirable to set the frequency of sampling at one sample volume for each 0.1 barrel of fluid which flows through the conduit 12. If such a frequency is selected for a produced fluid stream flowing at a rate of 500 barrels per day, 5.0 liters of produced fluid is accumulated in the sample container 17 each day. Because this 5.0 liter collected sample is a collection of samples of equal volume taken after equal increments of production, it is volumetrically averaged to reflect the composition of the fluid produced throughout the one day sampling period.

At the end of the desired sample accumulation time period, which may be selected on the basis of sample container 17 capacity, availability of personnel, or other criteria, the percentage oil in the collected sample in the container 17 is determined. The fluid sample is first heated, as by passing steam through the helical conduit 23, to reduce the viscosity of oil in the agitation chamber 25. The sample is then sufficiently agitated, by rotating the blades 20 at a high rate, to thoroughly homogenize the accumulated mixture of oil and water and thereby obtain uniformity of sample composition throughout the agitation chamber 25.

After the accumulated sample in the sample container 17 is completely homogenized, a smaller testing sample or testing volume is removed from the agitation chamber 25, for example, through a sample outlet 26. The exact size of this testing volume is not critical to the method; however, the testing sample is preferable of a size small enough so that volumetric changes in the testing sample size in the order of two-tenths of one per cent may be observed in conventional measuring flasks. We have found that testing volumes in the range of 50 to 100 ml. are quite suitable for the practice of the method. For illustrative purposes, this description will be directed to the use of a 50 ml. testing volume.

Figure 3:
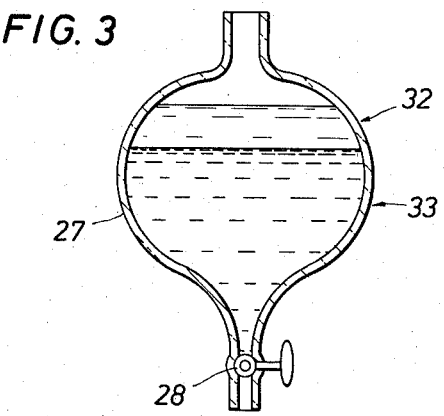
FIG. 3 shows a collected sample which has been treated according to the method of this invention.

The 50 ml. testing volume is placed in a container, such as centrifuge tube 27 of FIG. 3, which preferably has a valve 28 at its bottom. A small volume, preferably two or three drops, of a suitable emulsion breaker is then added to the testing volume of fluid to break the oil-water emulsions in the sample fluid. Those skilled in the art will, of course, appreciate that many emulsions breakers are commercially available and that the particular emulsion breaker used will depend upon the nature of the oil-water emulsions present in the testing volume. Emulsion breakers which may be suitable for particular emulsions are disclosed in U.S. Pats. Nos. 2,407,895; 2,175,699; 2,457,634 and 2,241,011; in British Pat. Spec. 2,175,699; and in Becker, Paul, Emulsions: Theory and Practice, N.Y., Reinhold, 1966, pp. 369–380. A fixed volume of a substantially water insoluable oil solvent more dense than water and, advantageously, substantially mutually insoluable with water, is then added to the centrifuge tube 27 to remove oil from the testing volume of fluid by solvent extraction. Those skilled in the art will appreciate that separation of the solvent and liquid phases is facilitated as the density difference between the solvent and water increase. We find it advantageous to use a solvent having a density at least 0.1 g/cc greater than the density of the water in the oil-water emulsion.

The solvent, which for example may be a polyhalogenated hydrocarbon such as dichloroethane or, advantageously, chloroform which is more dense, is added in an amount at least sufficient to maintain the density of the solution of solvent plus oil which may dissolve in the solvent greater than the density of water. Therefore, a greater quantity of solvent will be required if the density difference between the solvent used and water is slight or, if the produced fluid tested contains a high percentage of relatively high density crude. We have found that when using chloroform as the solvent in testing fluids having a percentage oil on the order of 20 percent or less, a fixed volume of chloroform about one-third or more of the size of the emulsion sample volume is adequate. In the example illustrated in FIG. 3, 50 ml. of chloroform is added to a 50 ml. emulsion testing volume.

Figure 4:
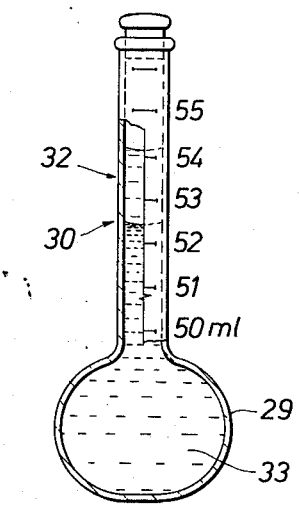
FIG. 4 illustrates the increase of the fluid of greater density which is measured in the practice of this invention.

After the fixed volume of solvent is added to the centrifuge tube 27, the tube is preferably agitated (by hand or mechanically) and centrifuged until a clean separation is obtained between the solution of solvent plus oil 33 and the water 32. The chloroform and oil solution or extract phase 33 will appear in the bottom part of the tube 27 and water 32, preferably containing less than 20 ppm oil will collect in the upper part of the tube. The heavier extract phase 33 is then drawn through valve 28 at the bottom of tube 27 into a volume measuring device such as graduated flask 29 of FIG. 4. Preferably, some water 32 is also drawn into the flask so that a clearly defined fluid interface 30 between the water 32 and the extract phase 33 is obtained. The volume of the extract phase 33 is then read from the flask.

Figure 5:
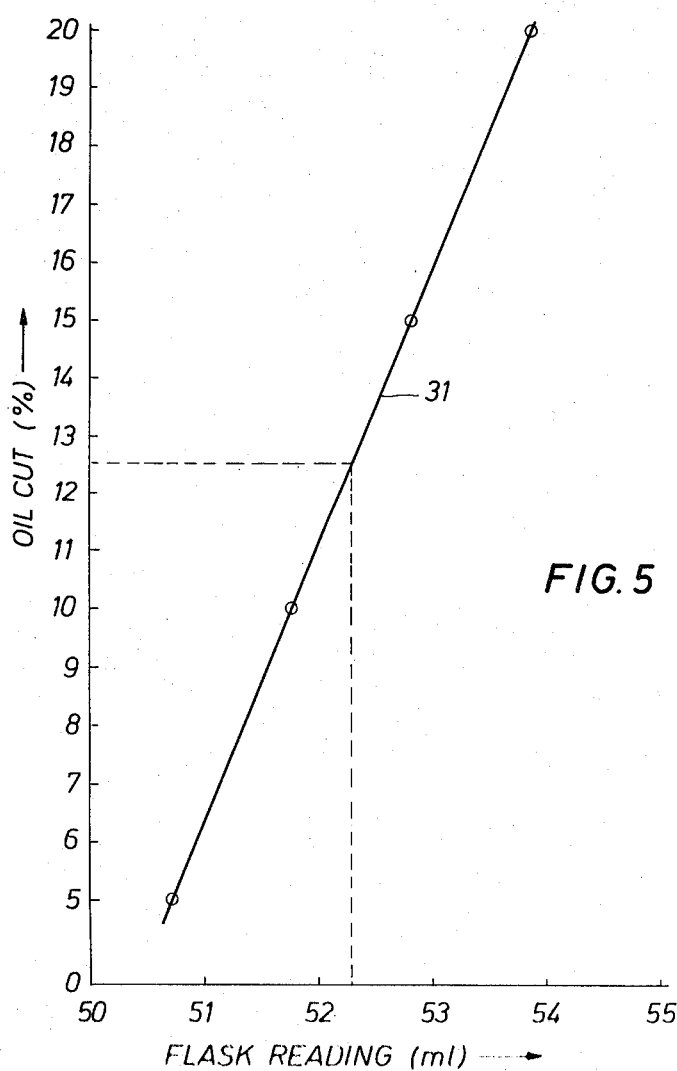
FIG. 5 illustrates a graph of oil cut versus flask reading of the type which may be used in the practice of this invention.

The percentage oil in the fluid sample collected in container 17 may then be determined from the volume of the extract phase 33 since the increase in volume of the solvent is proportional to the oil content of the testing volume of homogenized fluid. A preferred method of making this determination is by entering a chart, such as the graph of FIG. 5, which gives percentage oil as a function of flask reading for the testing volume of homogenized emulsion and fixed volume of solvent used. The chart is advantageously obtained by experimentally obtaining flask readings in the above described manner for emulsions of known percentage oil. In FIG. 5, the plotted points mark readings from emulsions of known oil content. These readings are connected by curve 31 to give a generalized relationship. This approach eliminates systematic errors inherent in the technique. For example, if some water is dissolved in the solvent, the curve 31 automatically corrects for this dissolved water.

In the example shown, the volume of extract phase 33 in flask 29 is 52.3 ml. By use of curve 31 of FIG. 5, percentage oil is determined to be 12.6 percent. This percentage oil is a volumetrically averaged value for the fluid flowing through the conduit 12 during the period of sample accumulation in the container 17. Therefore, to determine the total volume of oil which flowed through the conduit 12 during the accumulation period one needs only to multiply the total volume of fluid flow during the period, as determined from meter 13, by the percentage oil determined according to the method of this invention.

While the present description has been primarily directed to the measurement of percentage oil in the produced fluid from an oil well, it should be understood that the method of this invention may be used to determine the oil content of low percentage oil and oil-water emulsions originating from other sources, for example, the method may be used to determine the amount of polluting oil in refinery effluent streams.

We claim as our invention:

1. A method for determining the percentage oil in a sample of oil-water emulsion comprising:
   adding a selected volume of a substantially water insoluble oil solvent having a density greater than the density of water to the sample of oil-water emulsion to extract oil from the sample;
   measuring the volume of the oil solvent and extracted oil; and
   determining the percentage oil in the sample of oil-water emulsion from the increase in the volume of the oil solvent due to the extraction of the oil.

2. The method of claim 1 wherein the substantially water insoluable oil solvent having a density greater than water is a polyhalogenated hydrocarbon.

3. The method of claim 2 wherein the polyhalogenated hydrocarbon is chloroform.

4. The method of claim 1 wherein the sample of oil-water emulsion has a pre-selected volume; and including the step of proving a chart which gives percentage oil as a function of measured volume of oil solvent and extracted oil for the pre-selected sample of oil-water emulsion volume and the selected volume of oil solvent added to the sample.

5. The method of claim 1 including the steps of agitating and centrifuging the sample of oil-water emulsion and oil solvent having a density greater than water, after adding the selected volume of oil solvent having a density greater than water to the sample of oil-water emulsion, to obtain a clean separation between the water and the more dense solvent and extracted oil.

6. The method of claim 1 including the step of adding an emulsion breaker to the sample of oil-water emulsion to break the oil-water emulsion.

7. A method for determining the average percentage oil over a selected length of time in a flowing mixture of oil and water which includes an oil-water emulsion comprising the steps of:
   periodically extracting a selected sample volume of the flowing mixture of oil and water from the flowing mixture of oil and water;
   accumulating the periodically extracted selected sample volumes, for the selected length of time to obtain a volumetrically averaged sample of mixture of oil and water having a composition representative of the composition of the flowing mixture of oil and water over the selected length of time;

agitating the accumulated volumetrically averaged sample of mixture of oil and water sufficiently to homogenize the accumulated volumetrically averaged sample of mixture of oil and water;

collecting a selected testing volume of the homogenized mixture of oil and water in a container;

adding an emulsion breaker to the collected testing volume of homogenized mixture of oil and water in the container to break the oil-water emulsion;

adding a fixed volume of a substantially water insoluable oil solvent having a density greater than the density of water to the collected testing volume of homogenized mixture of oil and water in the container to extract oil from the collected volume of homogenized mixture of oil and water by solvent extraction;

removing the oil solvent and extracted oil from the container;

measuring the volume of the oil solvent and extracted oil; and determining the average percentage in the flowing mixture of oil and water over the selected length of time from the measured volume of oil solvent and extracted oil.

8. The method of claim 7 including the steps of:

providing a chart which gives percentage oil as a function of measured volume of oil solvent and extracted oil for the selected testing volume of homogenized mixture of oil and water and the fixed volume of oil solvent used.

9. The method of claim 8 wherein the chart is a graph of percentage oil versus volume of solvent and extracted oil.

10. The method of claim 7 wherein the oil solvent having a density greater than water is chloroform.

11. The method of claim 7 including the step of heating the accumulated volumetrically averaged sample of mixture of oil and water to reduce the viscosity of the oil in the sample and thereby facilitate homogenization of the sample.

* * * * *